United States Patent [19]

Bell, Jr. et al.

[11] 4,296,302
[45] Oct. 20, 1981

[54] ADAPTIVE CONTROL OF GAP VOLTAGE AND POWER TO CONTROL SERVO OPERATION OF AN ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp, New York, N.Y.

[21] Appl. No.: 68,329

[22] Filed: Aug. 21, 1979

[51] Int. Cl.³ .............................................. B23P 1/02
[52] U.S. Cl. ............................... 219/69 G; 219/69 C
[58] Field of Search ................. 219/69 G, 69 C, 69 S, 219/69 M; 318/590, 591

[56] References Cited

U.S. PATENT DOCUMENTS 3,668,379 6/1972 Roberts et al. ...................... 318/591
4,071,729 1/1978 Bell, Jr. ............................. 219/69 G Primary Examiner—C. C. Shaw
Attorney, Agent, or Firm—Harry R. Dumont

[57] ABSTRACT

The system includes a standard servo feed arrangement in which responsive to gap voltage, servo feed is controlled for the electrode tool or alternately the workpiece.

A further part of the system includes a gap voltage sensing lead and an analog to digital converter. At a predetermined point, a programmable computer is activated to provide an output signal through a digital to analog converter to influence the servo feed being controlled by the standard type servo feed system.

The output from the programmable computer is weighted with respect to the output amplifier to provide a predetermined ratio of magnitude of control. A further embodiment of our invention is a system similar to the servo system described above, but in which the additional control over the servo feed system is exercised responsive to power level sensed in the EDM gap.

7 Claims, 3 Drawing Figures

ADAPTIVE CONTROL OF GAP VOLTAGE AND POWER TO CONTROL SERVO OPERATION OF AN ELECTRICAL DISCHARGE MACHINING APPARATUS

BACKGROUND OF THE INVENTION

The field to which the present invention relates is that generally known as electrical discharge machining, sometimes hereinafter referred to as EDM, in which material is removed from an electrically conductive workpiece by the action of electrical gap discharges occurring between a tool electrode and a workpiece. A dielectric coolant fluid is circulated and recirculated through the gap, usually under pressure, throughout the machining operation. An electrode or a workpiece servo feed system is used to provide a relative movement and thus maintain an optimum gap spacing between the electrode and the workpiece as the workpiece material is being removed. A number of electrical discharge machining servo feed systems are known in the prior art that are of the basic analog type.

Examples of these are U.S. Pat. No. 4,152,569 issued on May 1, 1979 to Oliver A. Bell, Jr. et al for "Servo Feed Circuit for Electrical Discharge Machining Apparatus". This patent shows and describes a feedback circuit for control of servo velocity on up feed and down feed.

U.S. Pat. No. 3,793,502 issued on Feb. 19, 1974 to Oliver A. Bell, Jr. for "Servo Feed Circuit for Electrical Discharge Machining Apparatus". This servo feed system includes a plurality of reference voltage potentiometers and operational amplifiers with a specialized summing arrangement for different polarity operations.

U.S. Pat. No. 3,727,024 issued on Apr. 10, 1973 to Oliver A. Bell, Jr. for "Electrical Discharge Machining Servo Control Circuit". This patent discloses and describes a particular "keyed" servo feed circuit including a field effect transistor.

As electrical discharge machining power supplies and machine tools became more sophisticated, it became a common design goal to take away many of the adjustments and to lessen the degree of judgment required of an operator. It is desireable to make the operation automatic wherever possible so that the equipment may run on an around-the-clock basis with limited operator attention. In line with this course of development, systems have been devised which included computer control or control by stored input data that promise to a degree to provide this objective. One such system showing servo feed mechanism is described and shown in U.S. Pat. No. 4,071,729 issued on Jan. 31, 1978 to Oliver A. Bell, Jr. for "Adaptive Control System and Method for Electrical Discharging Machining".

BRIEF DESCRIPTION OF THE INVENTION

The present invention provides an EDM servo feed system that operates under normal gap cutting conditions to provide a servo feed through a servo motor in accordance with the relationship between a reference voltage and gap voltage. This operation involves balancing the reference voltage against the arc voltage and providing an analog output signal to the buffer amplifier and to the servo feed motor. Also included in the system is a general purpose computer such as a microprocessor, mini-computer or the like. The computer is programmable with respect to a particular value of gap voltage which represents optimum cutting level. A number representative of this voltage level is stored in the microprocessor. A sensing network is connected to the arc through an analog/digital computer and the output of that converter is constantly being updated and read to see if it is above or below the preset number. This is typically done in the ALU Unit of the microprocessor by taking the register in memory and incrementing it. If the number read is below, we take the number from the register and increment it. We then check the register for overflow. We have an overflow point of 50, 100 or some such number. If the exemplary number is 50, and for the last 50 times we have had an arc voltage that is too high, meaning we need more downfeed than the servo is presently providing, a number is loaded into the D & A converter connected to the computer output which will produce a small amount of downfeed voltage. This is then summed in with the standard servo control network output so that we have biased the servo motor to feed "down" a little bit more.

The result of this over-ride is, if the operator takes a voltage through his reference pot which is too high for a stable cut or for normal cutting, the computer will override the operator cutting and adaptably control the servo feed to bring it to the correct level for cutting voltage.

In a second embodiment of the invention the computer will be activated responsive to power in the gap. This will require two gap sensing networks, one for voltage and one for current. The current is typically sensed through an ammeter shunt resistor. So long as the level input of power is appropriate, the digital to analog output converter connected to the computer will be inoperative. We then have normal servo feed controlled from the standard servo feed network.

A further calculation however is involved. the average gap voltage and the average current are read, the two are multiplied in the ALU section of the computer and the resultant output will represent average power. Here again the power level has been predetermined for a particular set of machining circumstances. For example to produce an efficient finish and overcut. Thus if 500 watts is a selected amount of power needed in the arc, we will have preset the computer to maintain 500 watts cutting power in the gap.

If the sensed input to the computer indicates that the servo feed system is not pushing down hard enough or crowding enough to raise the power level, then we will adjust the downfeed bias on the servo feed motor to downfeed a little harder.

In the same manner discussed above, the computer will relieve the operator of some of the responsibility of the servo function. The operator in setting the reference voltage typically has preset the reference potentiometer and from time to time makes manual adjustments.

The computer is not required to be in a tight control loop watching the two gap A to D inputs constantly. It is only necessary for example that the computer update them every ten milliseconds or so for appropriate accuracy.

When the preset or predetermined power level is exceeded there will be provided an output for the D to A converter which will be combined with the standard servo feed output to control the servo operation.

A common feature in both the above embodiments is the inclusion of a control whereby the computer influence on the servo feed can be weighted as compared to the normal servo feed input. The ratio of the two can be 2 to 1, 3 to 1 or even 4 to 1. This relationship can be preset by the magnitude of resistors placed in series with the two control outputs prior to their being combined.

SUMMARY OF THE INVENTION

Our invention will be thus seen to provide an EDM servo feed system in which a normal servo feed operation in response to a gap parameter may be modified by the output from a computer which is sensitive to gap operating conditions. As a predetermined gap parameter, either gap voltage or gap power is used to provide an overriding or modifying signal from the computer through a D to A converter stage. This signal may then be combined with a normal servo figure signal for controlling the servo feed operation.

Our servo feed system wherever necessary provides an overriding control for the servo motor. It makes possible machining at optimum levels and minimizes the necessity for close operator attention during the entire machine cycle. One suitable type of programmable computer or microprocessor is the microprocessor type currently manufactured and sold by the Mostek Corporation, 1215 W. Crosby Rd., Carolton, Texas 75006 and known in the trade as MK 4080.

The several different components such as A to D and D to A converters and indicated in the drawings are currently commercially available from the National Semiconductor Corporation of Santa Clara, California as models MM 5357b and DAC 0800.

BRIEF DESCRIPTION OF THE DRAWINGS

The present invention, its operation, features and advantages, and the advancements which it affords will be understood from the following specification together with the drawings in which like numerals are used to refer to similar or like parts where they occur and wherein.

DETAILED DESCRIPTION OF THE PREFERRED EMBODIMENT

Figure 1:
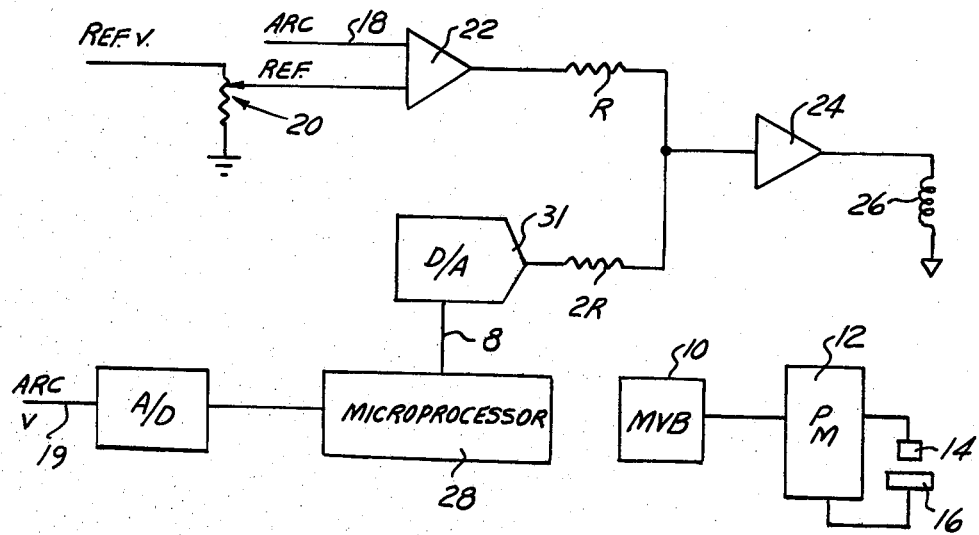
FIG. 1 is a combined schematic and block diagramatic showing of the invention in which the gap parameter responded to is gap voltage.

Shown in FIG. 1 are the basic elements of an EDM power supply and servo feed system. The main operating parts of the EDM power supply are a multivibrator 10 and a power module 12 associated with the machining gap which includes a tool electrode 14 and a workpiece 16. Machining power pulses are generated by the multivibrator 10 and passed through the power module 12. It will be understood that the machining power pulses are of precisely controllable on-off time.

The remainder of the elements shown in FIG. 1 are related to the servo control system. Included in this system are the elements of a standard servo feed which include an arc sensing lead 18 attached to the gap either to the tool electrode 14 or to the workpiece 16. A reference voltage is taken from a variable DC source and it may further be adjusted by the operator by means of a variable resistance such as potentiometer 20. The two signals are passed to a comparator 22. The resultant output is passed through a resistor R and thence to a buffer amplifier 24 and to an electrically controlled element of a servo feed motor. In this case, the electrically controlled element is a servo valve coil 26. Responsive to the magnitude and direction of current flow through the coil 26, the servo is controlled in its upfeed or downfeed movement. In the interest of brevity, the complete detail of such a servo system is not repeated.

The second part of the servo feed system includes a programmable computer 28 which may be a microprocessor or minicomputer or the like. A control input for the microprocessor 28 is taken from a second gap sensing lead 19 also used to sense gap voltage. The gap voltage sensed is passed through an A/D converter 30 and then to the microprocessor 28 which has prestored in it a data value representing a desired level of gap voltage for stable machining at a particular set of circumstances. These include generally machining rate, surface finish, and overcut, all of which vary for a number of different electrode and workpiece material combinations but can be determined by empirical data. The preset number is compared to that derived from the A/D converter 30 periodically. If this number is above the stored number, the register in memory is incremented. If this number is below the stored and preset number, we take a number from the register and decrement it. This register is checked for overflow. An overflow point of 50 or 100 or some other number is preselected. If there have been values for arc voltage which are too high for the last 50 times checked, then we know that more downfeed is required. Accordingly, a number is loaded into the D/A converter 31 that produces an additional voltage output to be summed in with the normal servo control circuit so the coil 26 is biased to downfeed more.

Otherwise stated, if the operator selects a voltage through potentiometer 20 that is too high for a stable cut or too high for normal cutting means, the computer will output a signal to override the operator and adaptively control the arc cutting operation. The degree to which this override is performed depends on the ratio of the resistor values for R and 2R or 1 to 2.

Figure 2:
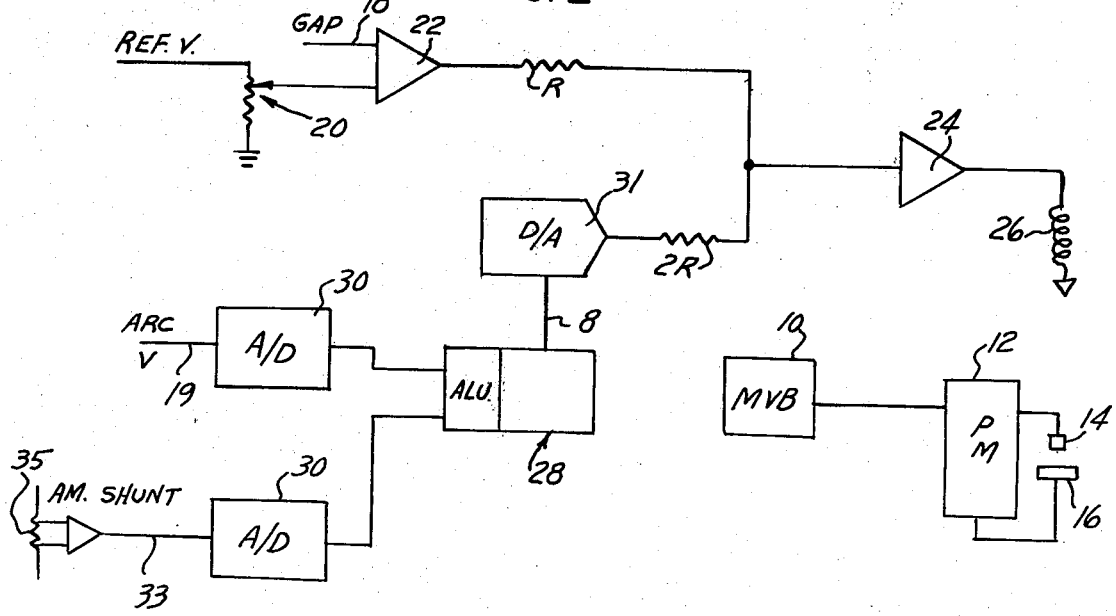
FIG. 2 is a combined schematic and diagramatic showing of the invention substantially similar to FIG. 1 but including a circuit for deriving and responding to gap power level.

FIG. 2 shows an alternate embodiment of the invention where modification of the servo feed signal is made responsive to gap machining power level. The standard servo in the upper section of the drawing is the same as that shown in FIG. 1. There are two connections made to the gap in the lower section. These include the lead 19 for sensing gap voltage and lead 33 coupled to a shunt resistor 35 for sensing gap current. Both voltage and current signals are passed through A/D converters 30 and then to the arithmetic logic unit of the computer 28 where they are multiplied to provide an output representation of gap machining power. A power level has been preselected for a particular set of machining circumstances—finish and overcut. If 500 watts represents the amount of power needed in the gap to provide these characteristics, then the computer will assist in maintaining 500 watts average power. In a like manner to the FIG. 1 circuit, the power representation number is compared to the preset number and the D/A converter 31 again biases the servo control to influence its operation. Again, the ratio of control is controlled by the relative magnitudes of resistors R and 2R.

Figure 3:
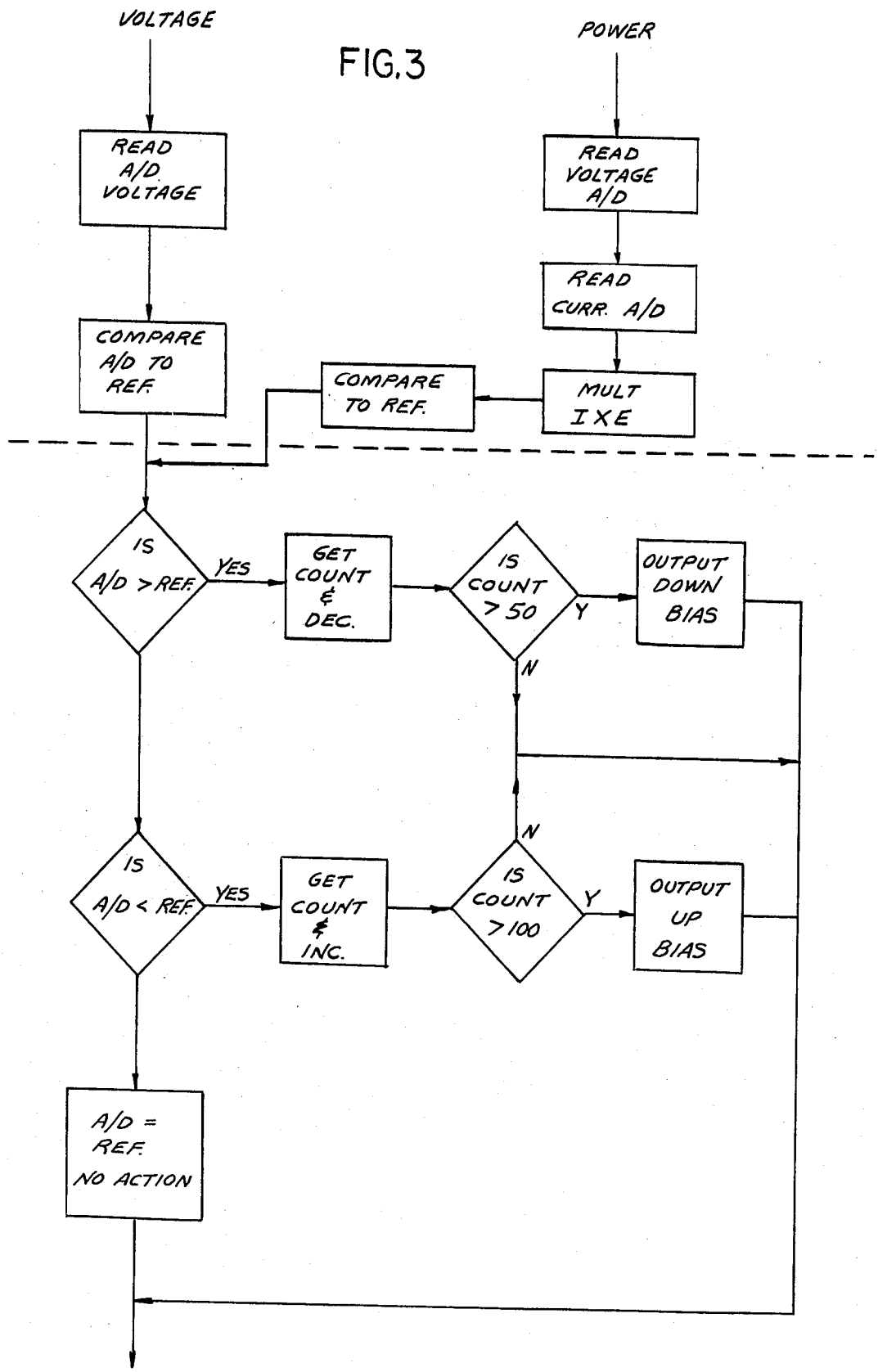
FIG. 3 is a flow chart diagram showing the mode of operation of our invention.

FIG. 3 is a flow chart that clarifies the mode of operation of the circuits of FIGS. 1 and 2. The gap voltage controlled embodiment is shown in the upper left hand portion of the drawing. The gap power controlled embodiment is shown in the upper right hand portion of the drawing. The part of the operation in common with the two embodiments is shown below the horizontal dash line in the drawing.

It will thus be seen that we have provided by our invention an improved and programmable EDM servo feed system with an operator override system.

We claim:

1. In an electrical discharge machining apparatus, an adaptive control system for providing relative movement between an electrode and a workpiece defining a machining gap including a servo feed motor and an electrically operated element for controlling said motor, comprising:
   a first servo feed circuit including a gap voltage sensing network and a reference voltage network operably connected to said element for operating it responsive to the difference of voltage therebetween;
   a second servo feed circuit including a second network for sensing gap voltage;
   means for converting the output of said second network for sensing gap voltage to a first digital value;
   means for comparing such first digital value to a predetermined and prestored digital value; and representative of optimum machining level;
   means for providing an analog output responsive to difference between said digital values and providing a second control output to modify the operation of said element and thus of said servo feed motor; and
   a summing network operatively connected to the outputs of said first and second servo feed circuits for combining them before passing them to said electrically operated element.

2. The combination as set forth in claim 1 wherein said summing network includes a pair of branches, each having a different magnitude of resistance for controlling the ratio in which said outputs are combined.

3. The combination as set forth in claim 2 wherein the resistance magnitude in said pair of branches are in the ratio of two to one.

4. The combination as set forth in claim 1 wherein a potentiometer is connected in said reference voltage network for selectively changing the reference voltage level.

5. The combination as set forth in claim 1 wherein said means for comparing includes a register of a programmable computer.

6. In an electrical discharge machining apparatus, an adaptive control system for providing relative movement between an electrode and a workpiece including a servo feed motor and an electrically operated element for controlling its operation, comprising:
   a first network operably connected to the machining gap for deriving a gap voltage signal;
   a reference voltage network;
   means for providing a first control output signal to said element responsive to difference between said gap voltage and said reference voltage;
   means connected to the gap for providing a signal representative of gap power;
   means for storing a signal representative of optimum gap power;
   means for comparing the last two above mentioned signals and providing responsive to their differences a further control output signal to said element.

7. The combination as set forth in claim 6 wherein said two control output signals are summed and weighted, one relative to the other.

* * * * *